United States Patent [19]
Loy et al.

[11] Patent Number: 4,730,912
[45] Date of Patent: Mar. 15, 1988

[54] DISTORTIONLESS SIGHT UTILIZING HOLOGRAPHIC COMPONENTS

[75] Inventors: Fernand Loy, Sceaux; Jean-Claude Perrin, Paris, both of France

[73] Assignee: Telecommunications Radioelectriques et Telephoniques, Paris, France

[21] Appl. No.: 700,932

[22] Filed: Nov. 16, 1984

[30] Foreign Application Priority Data

Nov. 16, 1984 [FR] France .................. 83 18209

[51] Int. Cl.⁴ .......................... G02B 5/32; G02B 27/10
[52] U.S. Cl. ........................ 350/503; 350/174; 350/505; 350/545; 350/3.7; 350/3.72; 350/3.73
[58] Field of Search ............. 350/503, 504, 505, 174, 350/545, 537, 571, 3.7, 3.72, 3.73, 145, 146

[56] References Cited

U.S. PATENT DOCUMENTS

| | | | |
|---|---|---|---|
| 4,530,564 | 7/1985 | Close | 350/3.72 |
| 4,669,810 | 6/1987 | Wood | 350/3.7 |

FOREIGN PATENT DOCUMENTS

| | | | |
|---|---|---|---|
| 7039 | 1/1980 | European Pat. Off. | 350/174 |
| 2406216 | 5/1979 | France | 350/3.7 |
| 2021803 | 12/1979 | United Kingdom | 350/3.7 |
| 2044476 | 10/1980 | United Kingdom | 350/145 |

OTHER PUBLICATIONS

H. Madjidi Zolbanine et al, "Holographic Correction . . . ", Appl. Opt., vol. 18, No. 14, Jul. 1979, pp. 2385-2393.

*Primary Examiner*—Jon W. Henry
*Attorney, Agent, or Firm*—Stevens, Davis, Miller & Mosher

[57] ABSTRACT

A sight comprises an image carrier (D) presenting an exit aperture (P3) and forming, from an observed image (I), an intermediate image (I') at the focus (F) of an ocular comprised of a spherical mirror (M) with the same optical axis (XX') as that of the image carrier (D), with a holographic beam deflection element (H) being placed at the focus (F) of the spherical mirror (M). In accordance with the invention, the intermediate image (I') is formed on the focal surface (S) of the ocular, and the holographic beam deflection element (H) is disposed on a support resting on the focal surface (S) and, in association with the spherical mirror (M), conjugates stigmatically the exit aperture (P3) of the image carrier (D) with the exit aperture (P1) of the sight.

5 Claims, 5 Drawing Figures

DISTORTIONLESS SIGHT UTILIZING HOLOGRAPHIC COMPONENTS

The present invention concerns a sight comprising an image carrier, also called a relay lens, having an exit aperture and forming, from an image observed, an intermediate image at the focus of an ocular consisting of a spherical mirror on the same optical axis as that of the image carrier, the focus being associated with at least one exit aperture of the sight located outside the optical axis common to the spherical mirror and to the image carrier, while a holographic beam deflection element is placed at the focus of the spherical mirror. The invention also concerns a method for the realization of a holographic beam deflection element for the development of the sight in accordance with the invention. The invention further concerns a method for the realization of a holographic spherical mirror for the development of the sight in accordance with the invention.

The invention finds particularly advantageous application in the field of light intensification night vision instruments such as binoculars used when piloting helicopters, or when driving vehicles, a driver's episcope for armored vehicles, observation and firing binoculars, visualization devices for thermal imaging cameras, etc.

French patent application No. 2 406 216 describes a sight that conforms to the introductory statement, one in which the holographic beam deflection element is flat and placed in the focal plane of the spherical mirror. This type of sight is inconvenient in that the holographic beam deflection element introduces distortions that add to the significant spherical aberration created by the spherical mirror such that the image provided by the sight assembly suffers from deformations, which must be minimized by inserting supplementary optical components between the spherical mirror and the sight's exit aperture. These supplementary optical components, in addition to increasing the cost and weight of the sight, also introduce the inconvenience of a reduction in eye relief, making it impossible for an observer who wears glasses to use the sight.

The purpose of the present invention is to correct these inconveniences by proposing a sight that is free of distortions and one that offers a long focal length. The invention is based on the idea that it is possible to correct aberrations introduced by the spherical mirror.

Indeed, in accordance with the present invention, a sight is formed comprising an image carrier having at least one exit aperture and forming from an image observed an intermediate image at the focus of an ocular consisting of a spherical mirror on the same optical axis as that of the image carrier, the focus being associated with at least one exit aperture of the sight located outside the optical axis common to the spherical mirror and to the image carrier, while a holographic beam deflection element is placed at the focus of the spherical mirror. The intermediate image is formed on the focal surface of the ocular, and the holographic beam deflection element is arranged on a support resting on the focal surface and in association with the spherical mirror so that it conjugates in stigmatic fashion the exit aperture of the image carrier with the exit aperture of the sight.

Thus, the holographic beam deflection element, which also can be called a field hologram because it is placed in the vicinity of the intermediate image, does not contribute to the formation of images, but only to the conjugation of the pupils. This therefore introduces no distortion in the final image. Further, the sight in accordance with the invention has a large field of observation, in the horizontal direction in particular, and this fits in well with the applications envisaged above.

It is best to have the sight's exit aperture relatively isolated from the optical axis of the ocular in order to disengage the focal surface from the observer's field of view. Given these conditions, the spherical mirror's spherical aberration can become quite significant, to the point of creating unacceptable astigmatism at the focus of the mirror. One can, in order to correct this stigmatism, take advantage of the conjugation of the pupils assured by the field hologram by making provisions for the installation of an offset Schmidt plate in the plane of the exit aperture of the image carrier and not in the plane of the sight's exit aperture, and thus gaining the advantage of avoiding the presence of a correcting element in front of the eye and at the same time retaining a long eye relief ocular.

Another advantage of the invention stems from the fact that it permits biocular vision, the result of the symmetry of revolution of the sight. To this end, it is anticipated that the holographic beam deflection element will furnish two beams deflected in symmetrical directions with respect to a plane of symmetry of the sight and passing through the optical axis common to the spherical mirror and to the image carrier. The ocular thus is common to the two paths, and the two images are perfectly superposable.

The invention also makes it possible to increase the diameter of the sight's exit aperture and to offer greater latitude of movement of the eye behind the ocular. This property is of particular interest for an all-terrain vehicle driving binoculars because it is very difficult to keep the eye in the sight's aperture under these conditions with the risk of sudden loss of perception of the entire field of view. It thus is anticipated that the holographic beam deflection element will provide multiple images from the exit aperture of the image carrier. These multiple images correspond to a multiplicity of sight entrance apertures and thus, by conjugation, to a multiplicity of exit apertures.

It is anticipated that the spherical mirror is a dichroic mirror arranged on the same support in a manner such that it is reflecting for a given wavelength and transparent to other wavelengths in order to permit observation of the outside world outside the field of the sight. The aforesaid spherical mirror is, in particular, a holographic mirror.

The invention also provides a method for the realization of a holographic beam deflection element for purposes of development of a sight in accordance with the invention. The recording of the holographic element is made by using, as the object wave, a converging spherical wave the focus of which is the center of the exit aperture of the image carrier on the one hand, and as the reference wave a diverging spherical wave the focus of which is the center of the sight's exit aperture on the other hand, the reference wave being reflected by the spherical mirror. Later on we will show that the principal advantage of the method is that it takes into consideration the spherical aberration of the spherical mirror, even when recording.

The invention also relates to a method for the realization of a sight in accordance with the invention, which includes the following operations:

(a) the spherical holographic mirror is replaced by a primary reference mirror of the same radius, metallized on its useful face;

(b) the primary reference mirror is illuminated by a diverging spherical wave the focus of which is the center of the sight's exit aperture;

(c) the wave reflected by the primary spherical mirror is recorded on an auxiliary hologram using a first plane wave as the reference wave;

(d) after development, the auxiliary hologram is returned to its place and the primary spherical mirror is replaced by the support for the holographic spherical mirror in a manner such that the photosensitive surface of the latter occupies exactly the same place as did the useful face of the primary spherical mirror;

(e) the auxiliary hologram is restored by a second plane wave in the same direction as the first plane wave, but turned in the opposite direction in a manner to restore the pseudoscopic image of the primary spherical mirror while at the same time creating a converging stigmatic wave the focus of which is the center of the sight's exit aperture.

As will be shown later, this method offers tha advantage of assuring good selective reflectivity while at the same time seeing to it that, from the point of view of geometric aberrations, that the holographic mirror thus realized acts exactly like a metallized spherical mirror.

The description that follows with respect to the attached drawings, provided as nonlimiting examples, provides a better understanding of the invention, and how it can be realized.

Figure 1:
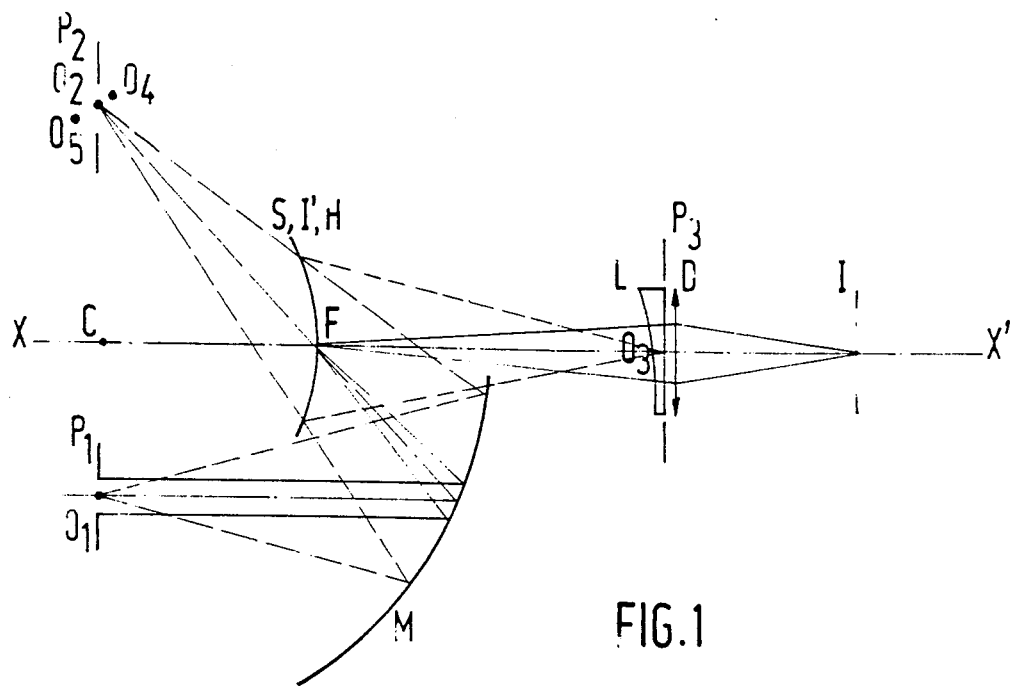
FIG. 1 is a cross section of a sight in accordance with the invention.

FIG. 1 shows, in cross section, a sight comprising an image carrier, D, represented here by a thin lens. This image carrier has an exit aperture, P3, that forms from observed image I an intermediate image, I', at focus F of an ocular comprised of spherical mirror M with the same optical axis, XX', an image carrier D. Observed image I can be the direct image formed by an objective, or the image, reinforced by an intensifier tube, of this direct image. Focus F is associated with exit aperture P1 of the sight located off optical axis XX'. The deflection of the beams from image carrier D toward exit aperture P1 is assured by holographic beam deflection element H placed at focus F of spherical mirror M. In addition, spherical mirror M has focal surface S, which is also spherical and centered in the center of curvature of mirror M. As can be seen in FIG. 1, the intermediate image I' is formed on focal surface S, whereas, on the other hand, holographic beam deflection element H is disposed on a support resting on focal surface S and which, in association with spherical mirror M, conjugates stigmatically exit aperture P3 of image carrier D and the sight's exit aperture P1. Thus, all rays that issue from center 03 of aperture P3 appear to come from pont 02, the center of entrance aperture P2 of the ocular, and the image of center 01 of the sight's exit aperture P1.

Stated another way, holographic element H is a field hologram that conjugates apertures P3 and P2 without taking part in the formation of the images. It therefore introduces no image distoration.

The sight in accordance with the invention has a large field of observation. The Applicant has shown that the horizontal field can exceed 60° and the vertical field 30°.

It is necessary to place exit aperture P1 quite a distance away from optical axis XX' in order to prevent field hologram H from being within the observer's field of view, the effect of which is to introduce significant spherical aberration due to spherical mirror M. As is shown in FIG. 1, this spherical aberration has been corrected, the conjugation of apertures P1 and P3 taken into consideration, by placing an offset Schmidt plate in exit aperture P3 of image carrier D rather than in exit aperture P1 of the sight so as to avoid having the corrector element in front of the eye and to retain a long eye relief ocular.

Moreover, it is possible to enlarge the sight's ocular collar by forming a multiple exit aperture, P1, from aperture P3. It is envisaged, for this purpose, that holographic beam deflection element H will furnish multiple images from exit apertures P3 of image carrier D. FIG. 1 shows the centers of two of multiple images at 04 and 05 which, after conjugation by spherical mirror M, will give several exit apertures around 01, which is equivalent to enlargement of the sight's ocular circle.

Figure 2:
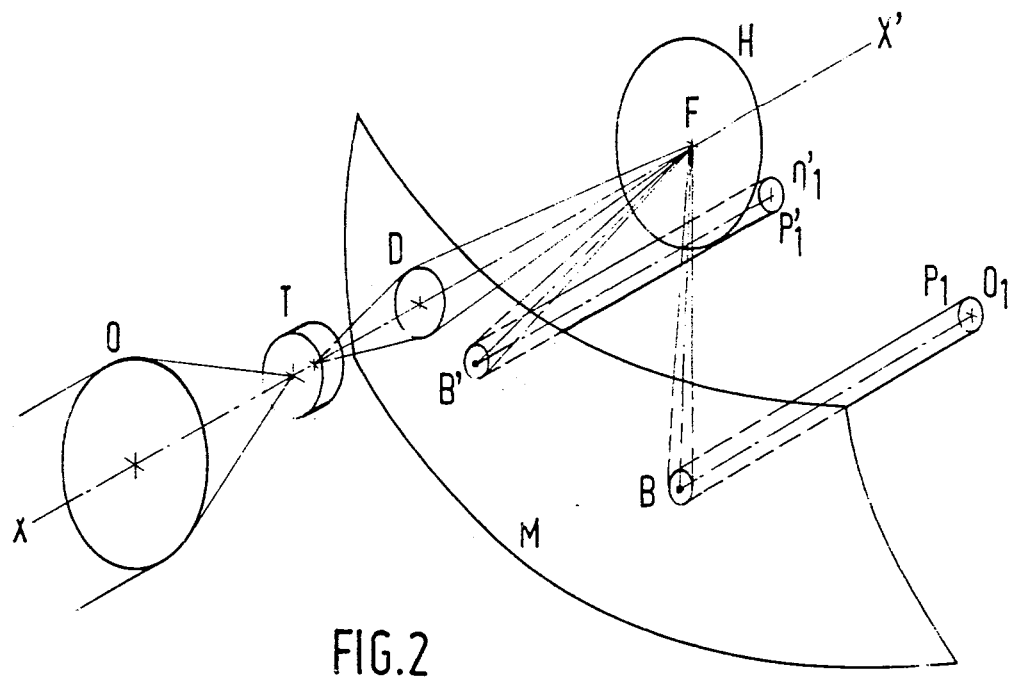
FIG. 2 is a perspective view of a telescope with a biocular sight in accordance with the invention.

The utilization of a hologram as the beam deflection element offers the advantage of being able to design a biocular sight. In this case, and in accordance with FIG. 2, holographic beam deflection element H furnishes two beams, FB and FB', deflected in symmetrical directions with respect to the plane of symmetry of the sight defined by optical axis XX' and the middle of segment B—B'. What is obtained is two exit apertures, P1 and P'1. The spherical aberration will not have the same direction for the right and left eyes, so it is necessary to split exit aperture P3 in order to insert two Schmidt plates that are identical in their geometric definition, but oriented differently. FIG. 2 shows a telescope assembly comprising just such a biocular sight associated with objective 0 and image intensifier tube T.

Figure 3:
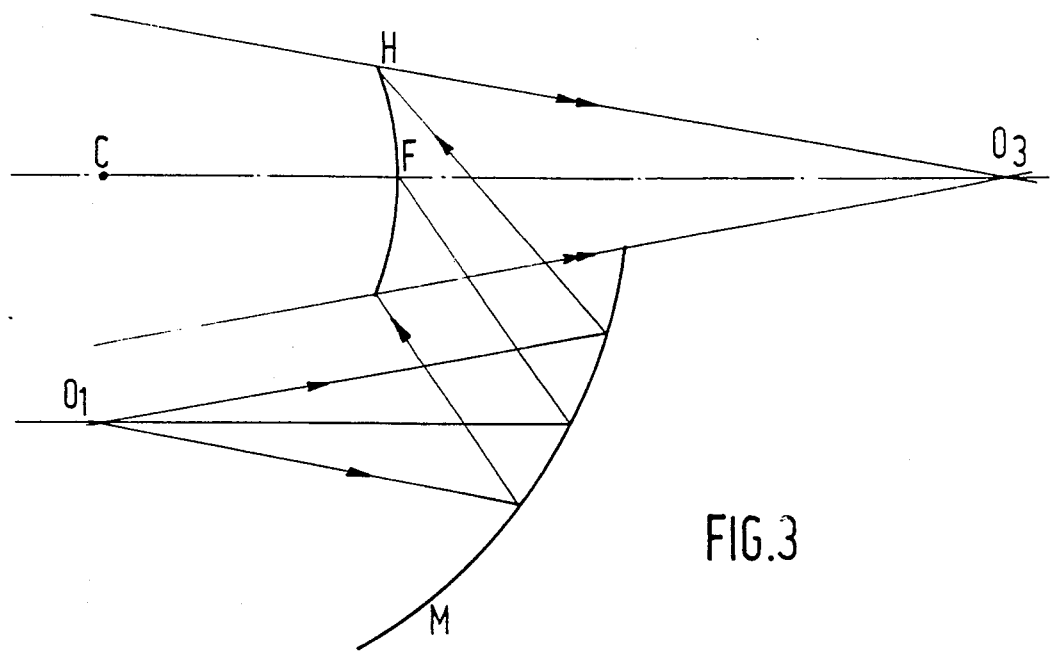
FIG. 3 is a cross section of a device from the realization of a holographic beam deflection element for developing a sight in accordance with the invention.

As for the realization of field hologram H, the Applicant has shown that a simple solution that would consist in the use of two spherical waves from foci 02 and 03 would lead to bad conjugation of 01 and 03 once the horizontal field exceeds about 10°, which is due to the fact that the hologram thus realized is stigmatic between 02 and 03, but not between 03 and 01 because image 02 from 01, furnished by the spherical mirror, is very aberrant. The Applicant thus has perfected a procedure for the realization of holographic beam deflection element H in order to develop a sight in accordance with the invention assuring stigmatism conditions between points 01 and 03. As is shown in FIG. 3, this procedure consists in the utilization on the one hand as the object wave a converging spherical wave the focus of which is center 03 of exit aperture P3 of image carrier D, and, on the other hand, as the reference wave a diverging spherical wave, the focus of which is center 01 of the sight's exit aperture, the aforesaid reference wave being reflected by the spherical mirror. Thus, because the spherical aberration attributable to spherical mirror M is taken into consideration when the hologram is recorded, conditions of stigmatism between 01 and 03 are realized.

The recording illustrated in FIG. 3 is repeated for several positions of aperture P3 in its plane in order to obtain a field hologram furnishing multiple images of aperture P3.

Figure 4:
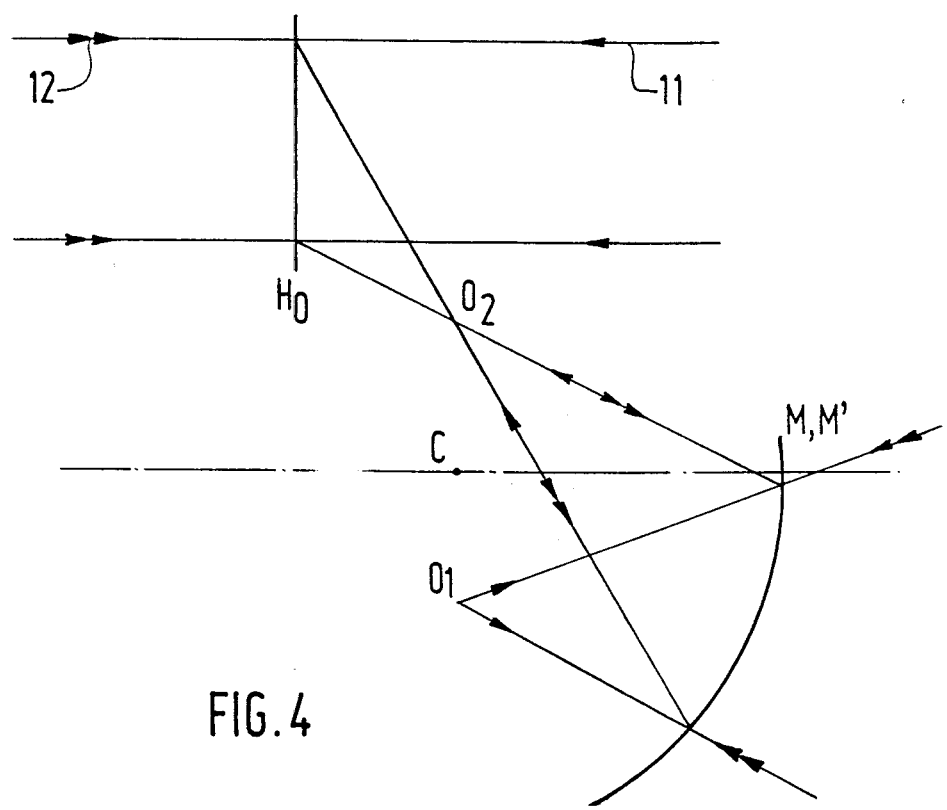
FIG. 4 is the cross section of a device from the realization of a holographic spherical mirror for the development of a sight in accordance with the invention.

In an advantageous form of realization of the invention, spherical mirror M is a dichroic mirror permitting observation of the outside world beyond the field of the sight. This mirror is reflected for a given wavelength, that of the luminophor of an image intensifier tube, for example, and transparent to other wavelengths. This dichroic mirror can be realized by interferential layers set by the classical thin layers procedures. It just as well can be a recorded holographic mirror with the waves the same wavelength as the reflection wavelength, the 0.5145 micrometer ray of an argon laser, for example, in association with a green luminophor. The procedure for the realization of such a spherical mirror must take into consideration a dual requirement. First, that of assuring a transmission factor as large as possible for the outside world, and the highest possible reflectance for the image provided by the sight. On the other hand, the aberrations of the holographic spherical mirror must be identical with those of an equivalent metallized spherical mirror. These two requirements are reconciled by the procedure illustrated in FIG. 4, which includes the following operations:

(a) a primary standard mirror, M', with the same radius and metallized on its useful face, is installed in place of the holographic spherical mirror;

(b) the aforesaid primary standard mirror, M', is illustrated by a diverging spherical wave, the focus of which is center 01 of the sight's exit aperture, P1;

(c) the wave reflected by primary spherical mirror M' is recorded on auxiliary hologram HO using a first plane wave, 11, as the reference wave;

(d) after development, the aforesaid auxiliary hologram, HO, is put back in place and the primary spherical mirror, M', is replaced by the support for the holographic spherical mirror in a manner such that the photosensitive surface of this latter occupies the same place as did the useful face of primary spherical mirror M';

(e) the auxiliary hologram, HO, is restored by a second plane wave, 12, from the same direction as that of the first plane wave, 11, but turned in the opposite direction in a manner so as to restore the pseudoscopic image of primary spherical mirror M', while a converging stigmatic wave is created, the focus of which is center 01 of the sights's exit aperture.

An interference figure thus is recorded in the thickness of the photosensitive surface, bichromated gelatin, for example, this figure comprised of one, and only one, spherical fringe with center C, the center of the spherical mirror, and which provides in the hologram thus recorded the same spherical aberrations as those of a metallized spherical mirror. The other fringes recorded on both sides of this central fringe present a deformation with respect to a sphere with center C. It is because of this deformation that a pronounced Bragg effect is obtained for points 01 and 02.

Figure 5:
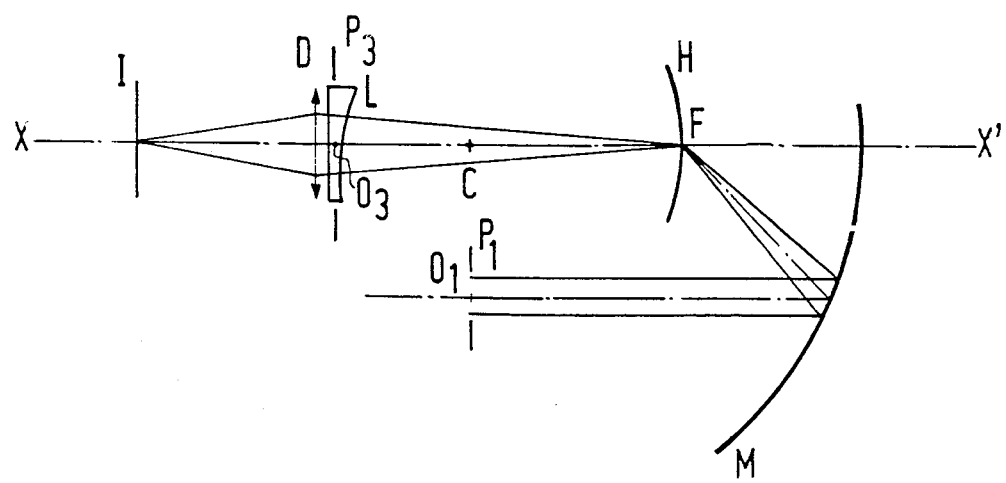
FIG. 5 is a cross section of a variant of the realization of a sight in accordance with the invention.

The invention should not be limited to just those modes of realization described above. It is understood, of course, that it can be developed just as well with the aid of any equivalent means available to the specialist. Specifically, and as is shown in FIG. 5, holographic beam deflection element H can be used in transmission instead of working in reflection as represented in FIG. 1.

We claim:

1. A sight comprising an image carrier having an exit aperture and forming, from an observed image, an intermediate image at the focus of an ocular comprised of a spherical mirror on the same optical axis as the image carrier, the focus being conjugated through said spherical mirror with at least one exit aperture of the sight located outside the optical axis common to the spherical mirror and to the image carrier; a holographic beam deflection element placed at the focus of the spherical mirror, the intermediate image being formed on the focal surface of the ocular and the holographic beam deflection element being disposed on a surface of a support, said surface being substantially geometrically identical with the focal surface, said holographic beam deflection element in association with the spherical mirror conjugating in stigmatic fashion the exit aperture of the image carrier with the exit aperture of the sight.

2. A sight in accordance with claim 1, further comprising an offset Schmidt plate arranged in a plane of the exit aperture of the image carrier.

3. A sight in accordance with claims 1 or 2, wherein said holographic beam deflection element furnishes two beams deflected in symmetrical directions with respect to the plane of symmetry of the sight passing through the optical axis common to the spherical mirror and to the image carrier.

4. A sight in accordance with claim 1, wherein the holographic beam deflection element furnishes multiple images from the exit aperture of the image carrier.

5. A sight in accordance with claim 1, wherein the spherical mirror is a holographic mirror.

* * * * *

UNITED STATES PATENT AND TRADEMARK OFFICE
CERTIFICATE OF CORRECTION

PATENT NO. : 4,730,912

DATED : March 15, 1988

INVENTOR(S) : Fernand LOY, Jean Clude PERRIN.

It is certified that error appears in the above-identified patent and that said Letters Patent is hereby corrected as shown below:

TITLE PAGE: [30] FOREIGN APPLICATION PRIORITY DATE

Change "Nov. 16, 1984" to --NOV. 16, 1983--

Signed and Sealed this

Thirteenth Day of December, 1988

*Attest:*

DONALD J. QUIGG

*Attesting Officer*  *Commissioner of Patents and Trademarks*